United States Patent [19]
Kovacs et al.

[11] Patent Number: 5,564,364
[45] Date of Patent: Oct. 15, 1996

[54] PET LITTER BOX WITH AUTOMATIC EXHAUST SYSTEM

[76] Inventors: Ronald K. Kovacs, 1209 Larriwood Ave., Kettering, Ohio 45429; Charles Yagher, Jr., Six Lost Spring Way, Ormand Beach, Fla. 32174

[21] Appl. No.: 366,248

[22] Filed: Dec. 28, 1994

[51] Int. Cl.⁶ .................................................. A01K 1/035
[52] U.S. Cl. ............................................... 119/163; 119/165
[58] Field of Search ...................... 119/19, 158, 163, 119/165, 170

[56] References Cited

U.S. PATENT DOCUMENTS

| | | | |
|---|---|---|---|
| D. 331,649 | 12/1992 | Saja | D30/161 |
| 3,428,026 | 2/1969 | Sohmers et al. | 119/9 |
| 3,455,277 | 7/1969 | Edwards . | |
| 3,487,814 | 1/1970 | Ingebritsen | 119/19 |
| 3,745,975 | 7/1973 | Prucha . | |
| 3,793,989 | 2/1974 | Clark | 119/19 |
| 3,885,523 | 5/1975 | Coleman | 119/19 |
| 4,021,975 | 5/1977 | Calkins | 52/64 |
| 4,029,048 | 6/1977 | Gershbein | 119/19 |
| 4,095,559 | 6/1978 | Griffith . | |
| 4,546,727 | 10/1985 | Andersen . | |
| 4,729,342 | 3/1988 | Loctin | 119/163 |
| 4,869,206 | 9/1989 | Spina | 119/17 |
| 4,940,016 | 7/1990 | Heath | 119/19 |
| 4,989,545 | 2/1991 | Sheaffer et al. | 119/17 |
| 5,092,270 | 3/1992 | Simons et al. | 119/19 |
| 5,129,364 | 7/1992 | Pirkle | 119/167 |
| 5,134,972 | 8/1992 | Compagnucci | 119/165 |
| 5,134,973 | 8/1992 | Sarullo | 119/165 |
| 5,140,948 | 8/1992 | Roberts | 119/165 |
| 5,178,099 | 1/1993 | Lapps et al. | 119/166 |
| 5,195,457 | 3/1993 | Namanny | 119/19 |
| 5,307,761 | 5/1994 | Berger, III et al. | 119/165 |
| 5,315,964 | 5/1994 | Mimms et al. | 119/165 |

*Primary Examiner*—Robert P. Swiatek
*Assistant Examiner*—Elizabeth Shaw
*Attorney, Agent, or Firm*—Biebel & French

[57] ABSTRACT

A ventilated litter box in which a lower pan removably receives an enclosing cover having a pet access opening, a ventilation opening, and a fan housing surrounding the ventilation opening which includes an electric fan positioned to withdraw air through the ventilation opening from an interior space while an exhaust outlet in the fan housing provides for escape of the air withdrawn from the space. An electronic circuit controls the operation of the fan. An apparatus for sensing the presence of a pet entering the interior space is provided with a capacitive pick-up in the form of a pair capacitive plates preferably located at or near either side of the access opening. The electronic circuit is responsive to the change of capacitance between the plates indicating the presence of the animal. A first time-out circuit delays the operation of the ventilating fan motor following the entrance of a pet into the interior of the box to avoid frightening the pet. A second time-out circuit turns off the ventilating fan motor after a predetermined delay period has elapsed.

15 Claims, 6 Drawing Sheets

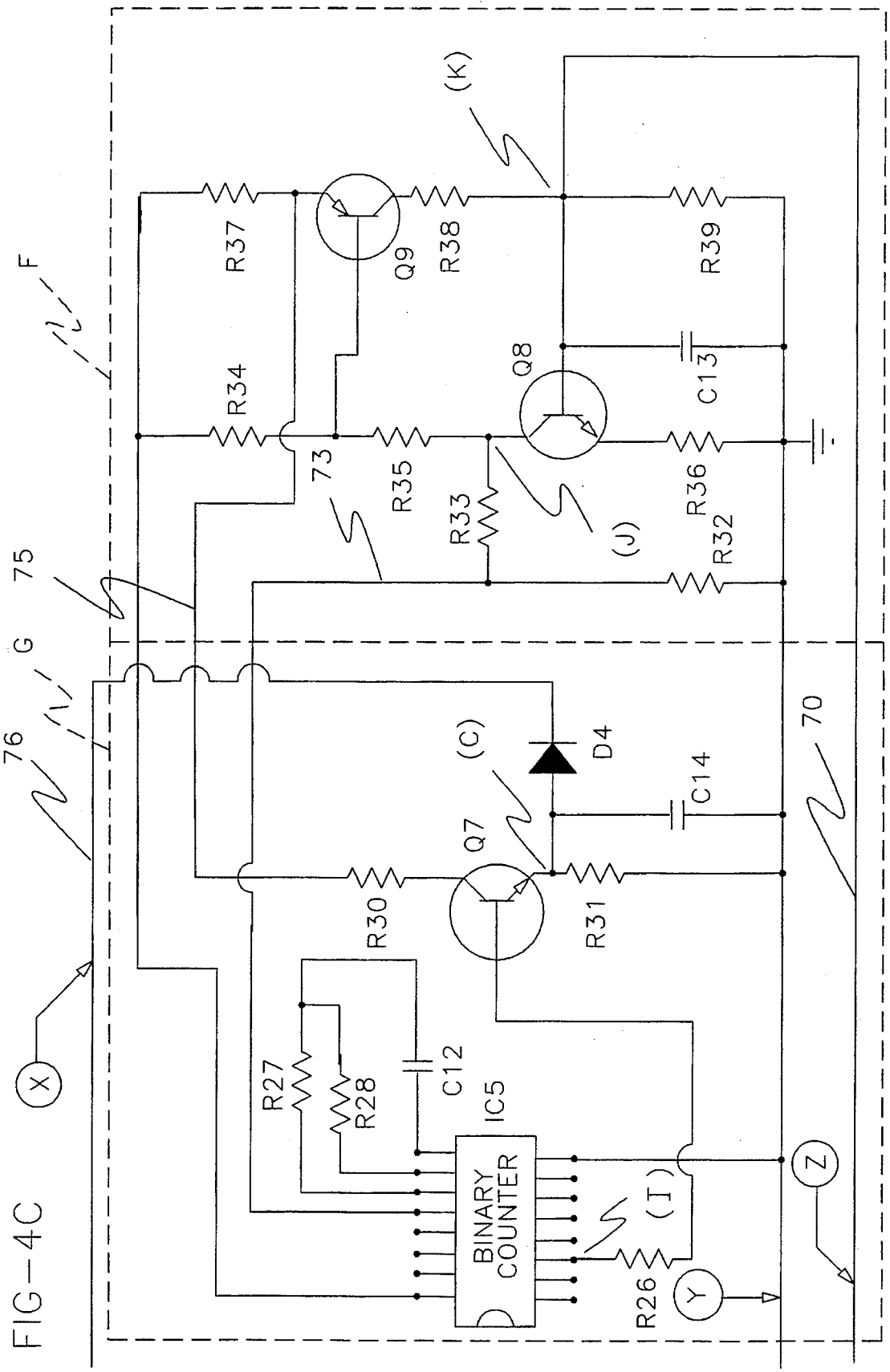

5,564,364

PET LITTER BOX WITH AUTOMATIC EXHAUST SYSTEM

BACKGROUND OF THE INVENTION

This invention relates to pet litter boxes with an automatic ventilation or exhaust system and more particularly to a self-contained ventilated litter box particularly adapted for cats.

Automatic cat or pet activated litter boxes have been proposed including that shown in the patent of Roberts U.S. Pat. No. 5,140,948, issued Aug. 25, 1992. The arrangements shown in this and similar prior art references for the operation or activation of the ventilating system depend upon physical contact by the pet with a component, such as a sensing switch, or the moving of a door, for the purpose of activating the ventilating system. In other instances, the ventilating system is simply turned on and run continuously.

An initiation device, such as an electric switch, which must be triggered by the pet may be obtrusive as well as undependable. Further, fan induced ventilating systems are anything but quite, particularly in the confines of a litter box enclosure, and the immediate activation of such a system may frighten an animal and thus may discourage the animal's proper use of the litter box.

SUMMARY OF THE INVENTION

This invention is directed to a ventilated litter box in which a lower pan or tray removably receives an enclosing cover, in which the cover is formed with an interior space over the pan for receiving a pet, such as a cat therein, and in which the pan is adapted to receive a quantity of litter. The cover is provided with an access opening by means of which the pet may enter and exit from this interior space.

The cover is also provided with a ventilation opening, and a fan housing surrounding the ventilation opening which includes an electric fan which is positioned to withdraw air through the ventilation opening from this interior space while an exhaust outlet in the fan housing provides for escape of the air withdrawn from the space.

An electronic control circuit connected to a source of fan power, which may be a battery or other low voltage source such as a transformer power supply source, controls the operation of the fan.

A particular advantage of the ventilated litter box of this invention is that the apparatus for remotely or passively sensing the presence of a pet entering the interior space is provided with a capacitive pick-up in the form of a pair of spaced apart capacitive plates preferably located at or near either side of the access opening. The electronic circuit is such that it is responsive to the change of capacitance between the plates indicating the presence of the animal without mechanically sensing the animal. The electric circuit is thereby controlled to initiate the operation of the fan and, using a time-out device, for terminating the operation of the fan.

The capacitive pick-up is therefore a noncontacting sensing device which is totally unobtrusive and, at the same time, highly reliable. Preferably, the pick-up plates as well as the electronic circuit are all associated with the removable cover.

A further improvement resides in the fact that the ventilation opening is shielded by a fluid impervious shield forming a part of the cover which is positioned to permit flow of air from the pan interior into the ventilation opening and prevent splashing of liquids, such as urine, into the opening, which could thereby be carried by the fan blades.

In a particular feature of the control circuit resides in the fact that a provision is made for the delayed operation of the fan motor so that the fan does not start immediately upon the entrance of the animal but the start-up is delayed for a given length of time, which length of time may be suitably selected or controlled. This feature serves to avoid frightening of the pet and to avoid association of the fan start-up with the entry of the pet into the litter box.

Provision is made for the insertion and removal of a cartridge-type filter and/or deodorizer package, which may be changed from time to time by insertion and removal from a position outside the cover.

It is accordingly an important object of this invention to provide an improved ventilated pet litter box and control system therefore, in which the control circuit is initiated by a change of capacitance between a pair of capacitive pick-up members.

A further object of the invention is the provision of a ventilated cat litter box, as outlined above, in which the initiation of the operation of a ventilating fan motor is delayed following the entrance of a pet into the interior of the box.

These and other objects and advantages of the invention will be apparent from the following description, the accompanying drawings and the appended claims.

BRIEF DESCRIPTION OF THE DRAWINGS

FIG. 2b is a view looking generally along the line 2b—2b of FIG. 2a;

FIGS. 4a–4c illustrate a schematic circuit diagram of a preferred embodiment of the electronic control circuit shown in FIG. 3.

DESCRIPTION OF THE PREFERRED EMBODIMENT

Figure 1:
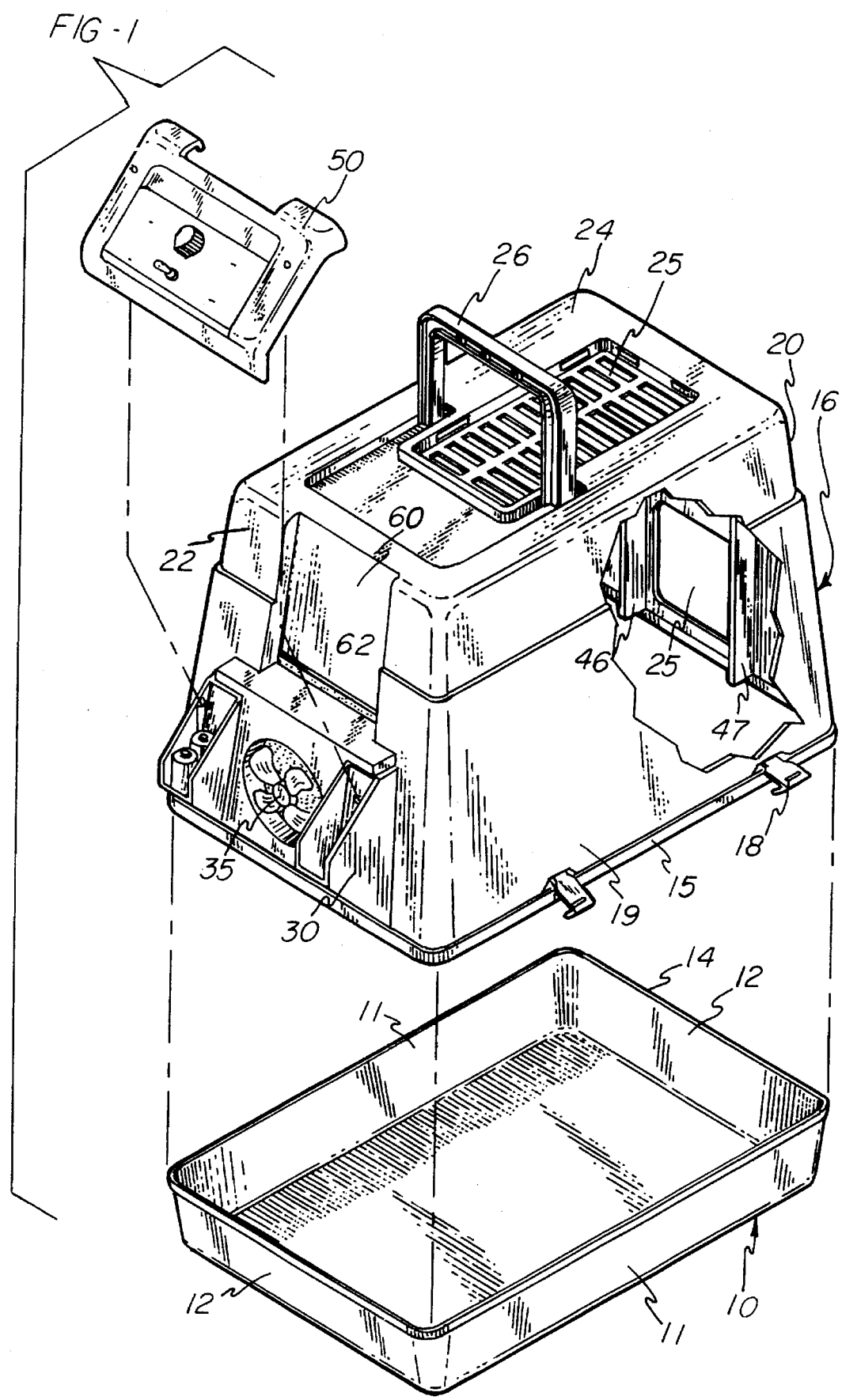
FIG. 1 is an exploded view of a ventilated pet litter box in accordance with this invention.

Referring to the figures of the drawing which represent a preferred embodiment of the invention, a ventilated pet litter box is illustrated in FIG. 1 as including a base pan 10. The base pan 10 may be generally rectangular in shape with upstanding sidewalls 11 and end walls 12 and adapted to contain a quantity of granular litter material therein. The walls 11 and 12 define a peripheral upper lip 14 adapted to receive thereon, a lower substantially peripheral lip 15 of a cover 16. The peripheral lip 15 of the cover 16 is designed so as to engage the base pan 10 at the rim or lip 14 in a generally fluid-tight manner thereby forming a fluid-tight connection when lowered or connected to the pan 10 and retained, such as by clasps 18.

The cover 16 is formed with sidewalls 19 and opposite sidewall, not shown, and enclosing end walls 20 and 22. A top or cover 24 may be provided with ventilating and light emitting openings 25, and a carrying handle 26, as desired.

One of the walls, such as the end wall 20, is provided with an access opening 25 by means of which a pet, such as a cat, may enter into and exit from the interior space defined between the cover 16 and the pan 10.

Figure 2B:
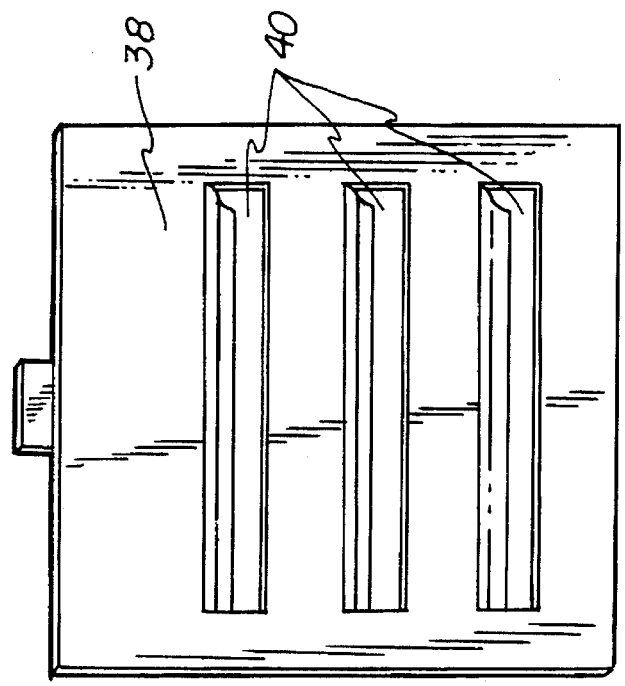

The opposite end wall 22 has means thereon defining a fan housing 30. The housing 30 may be integrally formed or molded with the end wall 22, and surrounds a ventilating opening 32 (FIG. 2a) formed in the end wall 22. An electric fan 35 is contained in the housing 30 adjacent the opening 32 and is positioned to withdraw air from the interior space through the ventilating opening 32. A lower sloping wall 38 of the housing 30 may be provided with a plurality of exit openings 40, as shown in FIG. 2b, thereby defining air exhaust outlets which provide for the escape of air withdrawn from the interior space by the fan 35.

Capacitive pick-up means includes a pair of laterally spaced apart metallic plates 46 and 47 positioned laterally on either side of the access opening 25 for remotely or passively sensing the presence of the animal, as illustrated in FIG. 1. The capacitive pick-up members comprising the plates 46, 47 form a portion of the electric circuit which is illustrated in FIGS. 3 and 4a–4c. The electric control circuit may be contained in a removable panel portion 50 of the housing 30. This panel portion 50 is shown as including an on/off toggle switch 52 and a timer control knob 54, also forming a part of the circuit, to be described in further detail in connection with the diagrams of FIGS. 3 and 4a–4c.

Figure 2A:
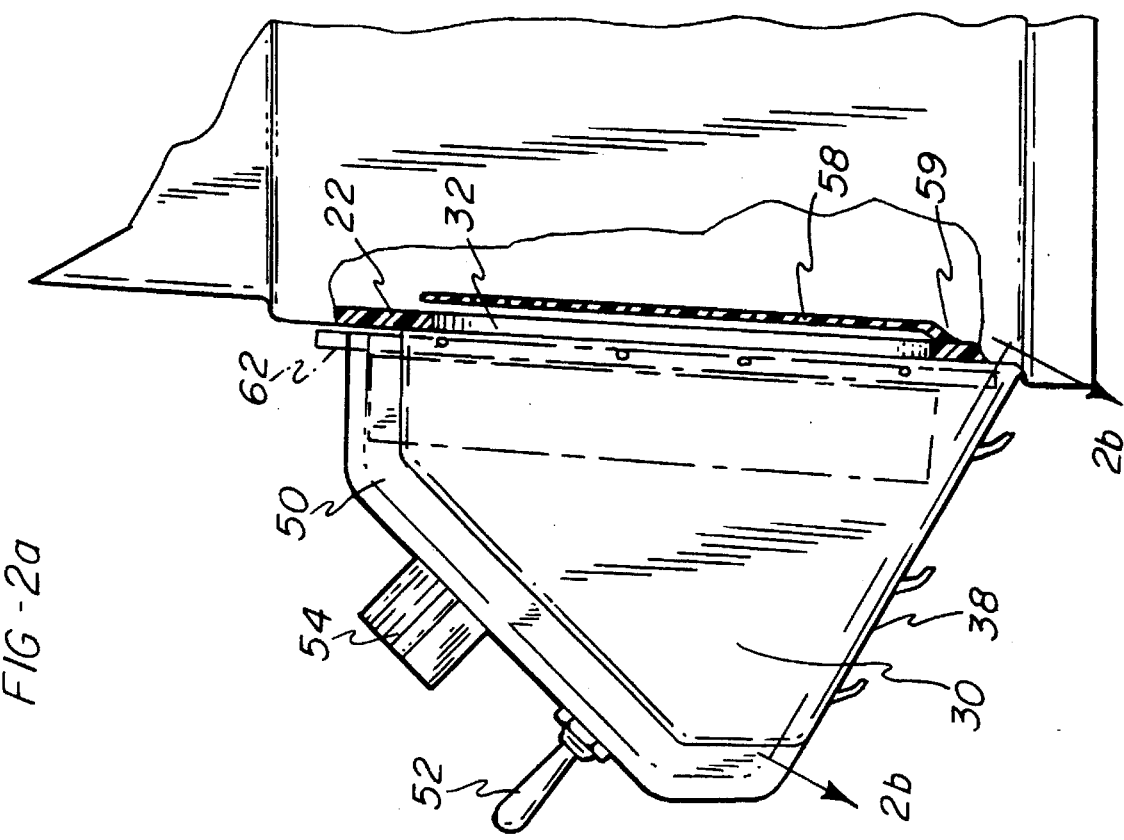
FIG. 2a is a fragmentary side view of a portion of the cover of FIG. 1.

The cover 24 is also formed with an integral splash shield 58 at the wall 22 in spaced relation to the ventilation opening 32, as illustrated in FIG. 2a. The shield 58 is attached to the wall 22 along a lower edge 59 thereof immediately below the bottom portion of the opening 32 and extending upwardly in somewhat spaced relation to the opening. The shield 58 is fluid impervious and serves as a deflector to prevent liquids, such as sprayed urine, and kicked up granular litter, from entering the interior of the housing 30 or contacting the fan blades of the fan 35 within the housing 30.

The wall 22 is further provided with a recess or slot 60 for the purpose of receiving a filter package 62 between the ventilation opening 32 and the fan 35. The filter package 62 may contain a deodorizer filter, such as an activated charcoal filter, and may also contain, if desired, air freshening crystals or other air freshening material. The package 62 may be removed by lifting vertically through the slot 60 and replaced in the same manner.

Figure 3:
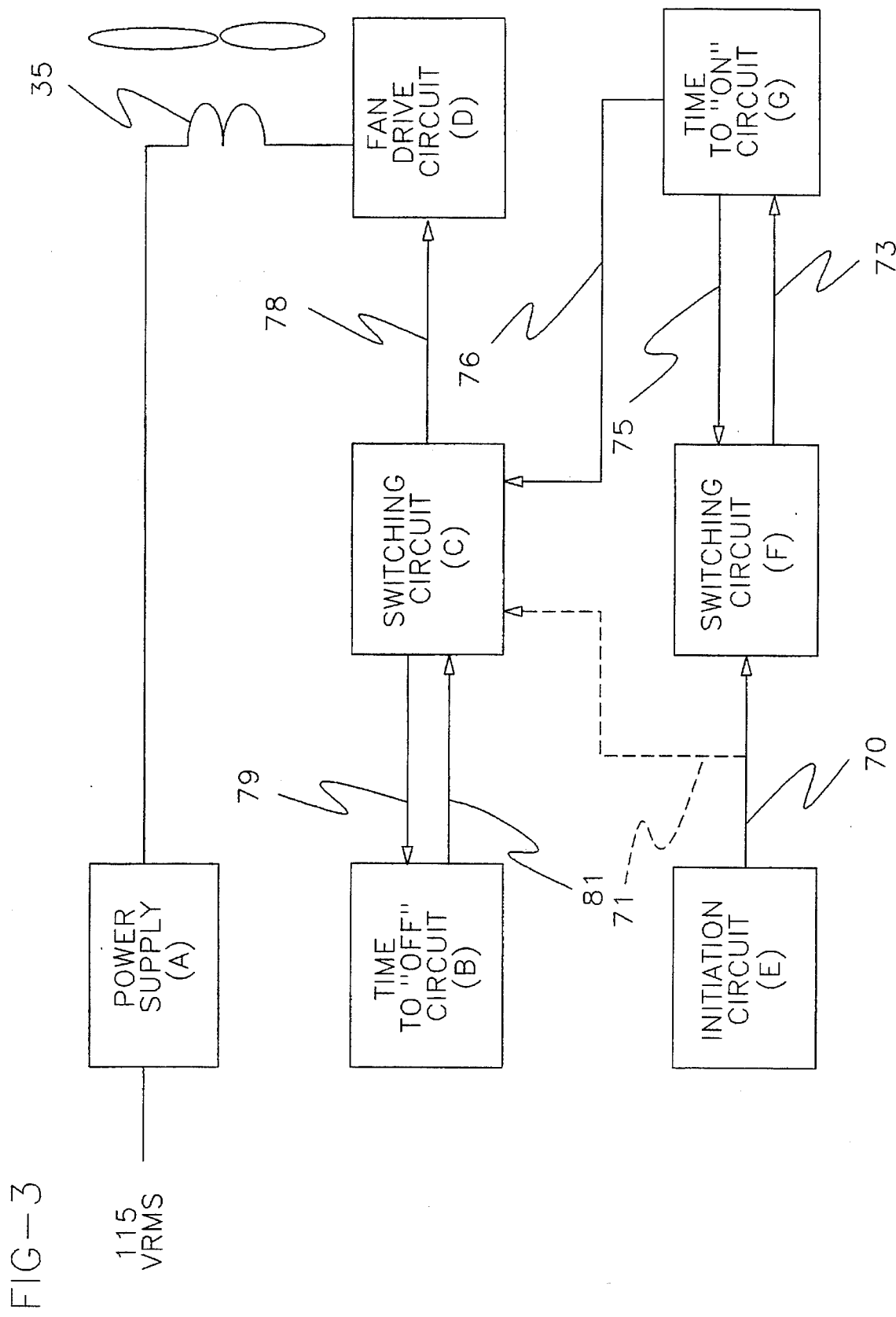
FIG. 3 is a block diagram of the electronic control circuit.

The electronic control circuit for the automatic exhaust system is shown in block diagram form in FIG. 3 and can be divided into seven main areas of operation: the power supply circuit (A), the time to "off" circuit (B), the first switching circuit (C), the fan drive circuit (D), the initiation circuit (E), the second switching circuit (F), and the time to "on" circuit (G).

The initiation circuit (E) generates an initiation signal 70 upon detection of the animal entering the access opening 25. The initiation signal 70 can either be used to trigger first switching circuit (C) as shown by line 71 so that the fan 35 begins operating as soon as the animal is detected, or more preferably, the initiation signal 70 can be used to activate the second switching circuit (F) in order to delay the operation of the fan 35 for a predetermined time period. Once activated, the second switching circuit (F) generates a timer on signal 73 which initiates a timing function of the time to "on" circuit (G). After the predetermined time period has elapsed, the time to "on" circuit (G) generates a deactivation signal 75 to turn off the second switching circuit (F), and generates a trigger signal 76 to activate the first switching circuit (C). When activated, the first switching circuit (C) generates a fan drive signal 78 to cause the fan drive circuit (D) to operate the fan 35 for as long as the fan drive signal 78 is present, and generates a timer on signal 79 which initiates a timing function of the time to "off" circuit (B). Once a predetermined time period has elapsed, the time to "off" circuit (B) generates a deactivation signal 81 to deactivate the first switching circuit (C) and turn off the fan drive signal 78 to the fan drive circuit (D).

Figure 4A:
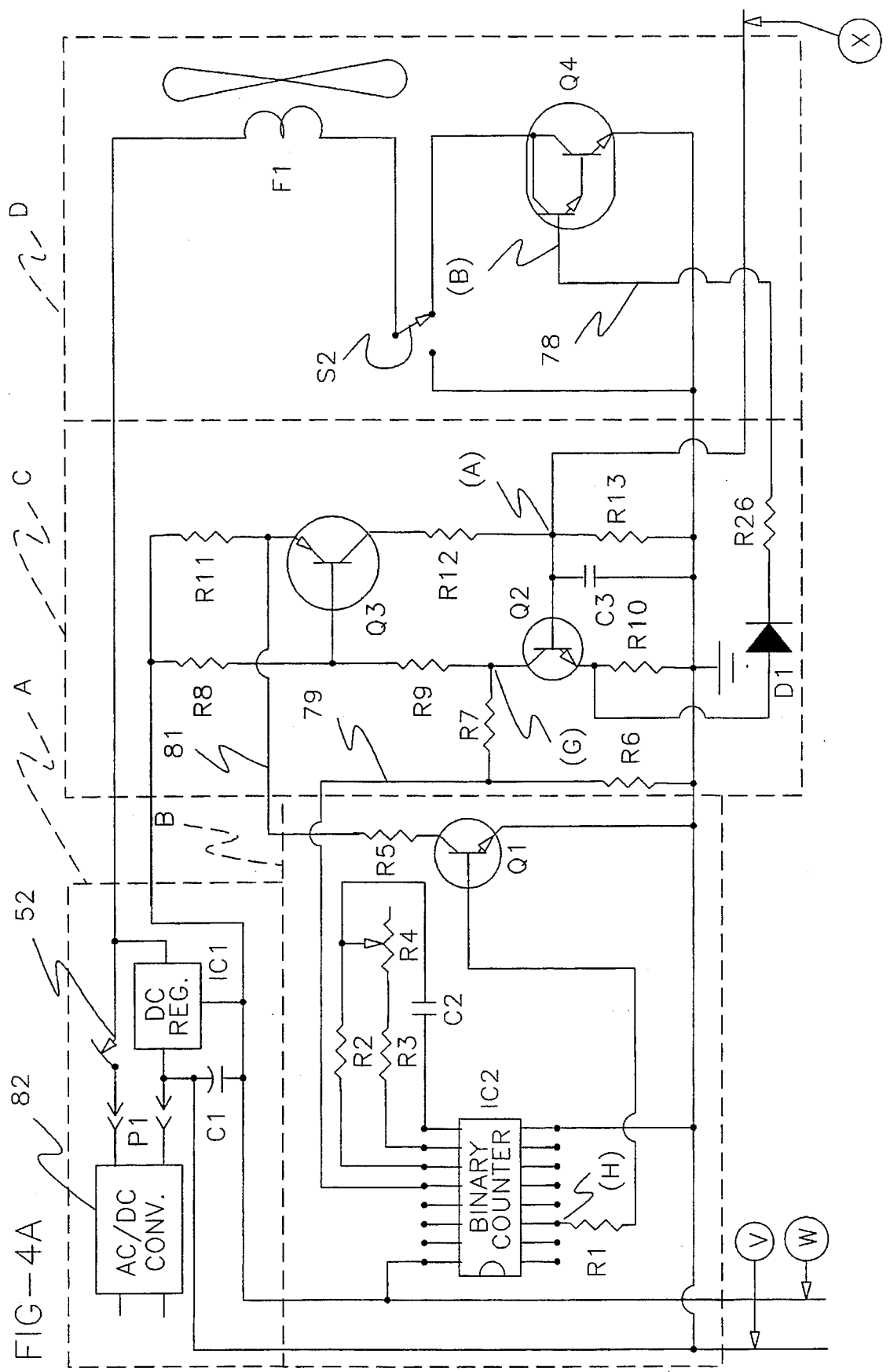
Figure 4B:
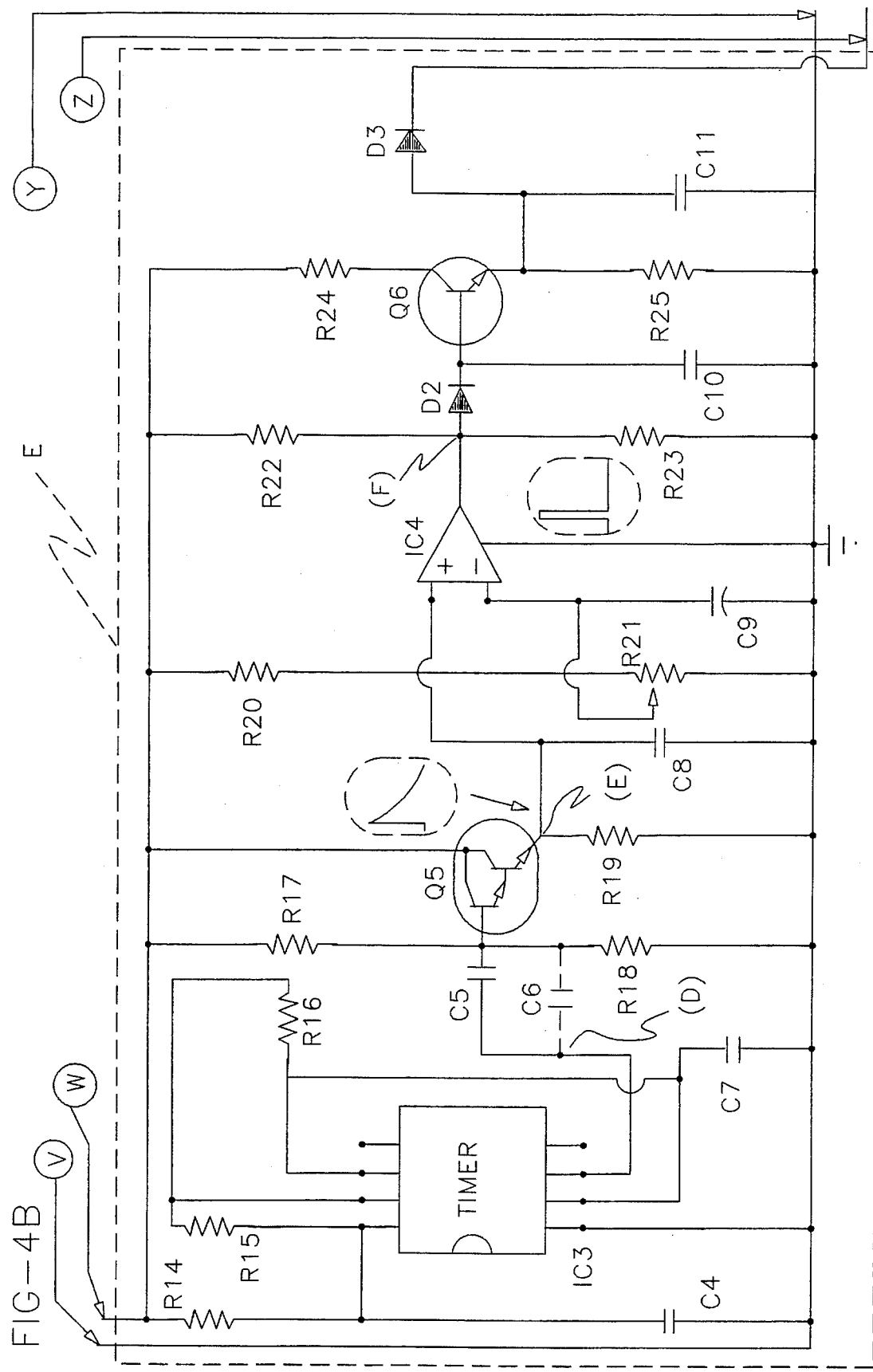

Referring now to FIGS. 4a–4c which illustrate a preferred embodiment of the electronic control circuit shown in FIG. 3. The first switching circuit (C) forms the pivot of the electronic control circuit operation and includes a npn transistor Q2, and a pnp transistor Q3. The first switching circuit (C) is turned on by the time to "on" circuit (G), is turned off by the time to "off" circuit (B), and provides the bias voltage for turning on the fan drive circuit (D).

Power is applied to the electronic control circuit via an AC/DC convertor 82, a connecting means P1, the ON/OFF toggle switch 52, and a DC regulator IC1 of the power supply circuit (A). When power is applied to the electronic control circuit, both transistors Q2 and Q3 remain in the nonconducting current or reversed biased mode. Transistor Q3 is biased on only when voltage across R8 is sufficient for biasing on the Vbe of Q3 and resistor R11. Since no current is flowing through transistor Q2, no voltage is dropped across resistor R8 and therefore transistor Q3 remains in an off state. The same is true for transistor Q2 which requires a voltage drop across resistor R13 to change its state of current conduction from off to on.

Capacitor C3 is connected between node A, the base terminal of transistor Q2, and circuit ground and appears as a momentary electrical short at the base of transistor Q2 to voltage surges during power turn on. This is done so that transistors Q2 and Q3 will remain in an off state as power is turned on. Transistor Q2 is turned on when a more sustained bias voltage is applied to node A via diode D4 of the time to "on" circuit (G). Transistor Q2 is biased on by the voltage which appears at the emitter of Q7 by means of the diode D4 in the time to "on" circuit (G). The operation of the time to "on" circuit (G) is discussed further below in connection with the initiation circuit (E) and the second switching circuit (F). When Q2 is turned on, a direct current flows through resistors R8, R9, and R10; the current flowing through R8 causes a voltage drop which biases on transistor Q3. Once transistor Q3 is turned on, a direct current flows through R11, R12 and R13. The voltage drop across R13 biases transistor Q2 in the current conducting on state and completes the on state round robin continuous current flow for the on states of transistors Q2 and Q3. Both transistors Q2 and Q3 continue in the on state until either the power is turned off or one of the transistors is forced into an off state condition.

When both transistors Q2 and Q3 are in a steady state on condition, the emitter current of transistor Q2 flowing through resistor R10 develops a voltage across resistor R10. The voltage across R10 i.e. the fan drive signal 78, is impressed across diode D1, resistor R26 and the Vbe of a darlington transistor Q4 causing current to flow into the base of Q4, node B. The darlington transistor Q4 forms at least a part of the fan drive circuit (D).

The timer control knob 54 includes a toggle switch S2 and a variable resistor R4. When the control knob 54 is in an "off" position (fully counterclockwise), the variable resistor R4 is not operational and the switch S2 connects one side of the fan coil F1 directly to ground so that the DC voltage from the AC/DC convertor 82 is impressed across the coil F1 to operate the fan 35 continuously without being automatically turned off, provided that the opposite side of the coil F1 is connected to the AC/DC power convertor 82 through ON/OFF toggle switch 52 and connecting means P1. When the control knob 54 is in an "on" position (turned in a clockwise direction), the variable resistor R4 controls the delay time for deactivating the fan 35, and the switch S2 connects one side of the coil F1 to the collector terminal of the transistor Q4 as shown in FIG. 4a. When the base current into transistor Q4 is made sufficient, the darlington transistor Q4 conducts current through the coil F1 to operate the fan 35 for as long as the base current i.e. fan drive signal 78 is maintained.

Diode D1 serves as a blocking diode, conducting current only when the anode is at a more positive voltage than the cathode and allowing only leakage current to flow when the voltage is reversed. This diode D1, termed as a blocking diode, prevents any current flow from transistor Q4 to transistor Q2 which could disrupt the operation of the first switching circuit (C).

The initiation circuit (E) includes active components IC3, Q5, IC4 and Q6. Integrated circuit IC3 is a timer that generates a continuous pulse train, node D, at a frequency determined with selected values of resistors R14, R15 and R16, and capacitors C4 and C7. Capacitors C5 and C6 in parallel form one leg of a differentiation circuit that turns the pulse train at node D into a series of individual differentiated waveforms. The input resistance of transistor stage Q5 forms the second leg of the differentiation circuit. The input resistance is designed to be of a high value so that capacitors C5 and C6 can be small. This makes the size of the plates 46, 47 for capacitor C6, the sensing capacitor, reasonably small. When the pet animal is near or enters the enclosure, the capacitance value of C6 increases causing an increase in the amplitude peak of the differentiated waveform that appears at the emitter terminal of transistor Q5, node E. Capacitor C8 is connected between the emitter terminal, node E, of transistor Q5 and circuit ground to appear as a low impedance path for any spurious high frequency oscillations. The emitter of transistor Q5 is connected directly to the positive input terminal of the comparator IC4. Resistors R20 and R21 form a voltage divider for establishing a reference voltage at the negative input terminal of comparator IC4. To develop a pulse or pulse train at the output of IC4, node F, the differentiated voltage amplitude at node E, the positive input terminal of comparator IC4, needs to exceed the reference voltage provided at the negative input terminal.

Transistor Q6 can either supply the voltage to node A via line 71 (see FIG. 3) for biasing on transistor Q2 when the delayed turn "on" feature is not present, or supply the voltage i.e. timer on signal 73, to the base of transistor Q8, node K, for initiating a delayed turn "on" mode. The bias voltage, or timer on signal 73 is developed across resistor R25 when transistor Q6 is in the on current conducting state. Transistor Q6 is normally in the off state with no current flowing through resistor R25. When a positive direction pulse train appears at node F, capacitor C10 charges towards the amplitude of the first pulse through diode D2. In that the charge time in this diode direction is short, the capacitor C10 quickly charges during the time of the pulse positive amplitude. When the pulse at node F becomes a lower voltage than the voltage charge on capacitor C10, the capacitor C10 starts to discharge but because the diode D2 is now reversed biased and the input resistance into transistor stage Q6 is a very high value, the discharge time becomes much longer than the time period of the pulse. Therefore, the voltage charge on capacitor C10 discharges very little before the next pulse appears thus recharging the capacitor C10 once again. This voltage charge on capacitor C10 biases transistor Q6 to an on state condition in which current flows through resistor R25 resulting in a voltage drop across resistor R25 which initiates the delayed turn on mode of the second switching circuit (F), and more specifically transistor Q8.

The operation of the second switching circuit (F) comprising transistors Q8 and Q9, is very similar to the operation of the first switching circuit (C). When power is applied to the electronic control circuit, both transistors Q8 and Q9 remain in the nonconducting current, or reversed biased mode. Transistor Q9 is biased on only when voltage across R34 is sufficient for biasing on the Vbe of Q9 and resistor R37. Since no current is flowing through transistor Q8, no voltage is dropped across resistor R34 and therefore transistor Q9 remains in an off state. The same is true for transistor Q8 which requires a voltage drop across resistor R39 to change its state of current conduction from off to on. Capacitor C13 is connected between node K, the base terminal of transistor Q8, and circuit ground and appears as a momentary electrical short at the base of transistor Q8 to voltage surges during power turn on. This is done so that transistors Q8 and Q9 will remain in an off state as power is turned on. Transistor Q8 is turned on when a more sustained bias voltage is applied to node K by the voltage which appears at the emitter of Q6 by means of the diode D3 in the initiation circuit (E). When Q8 is turned on, a direct current flows through resistors R34, R35, and R36. The current flowing through R34 causes a voltage drop which biases on transistor Q9. Once transistor Q9 is turned on, a direct current flows through R37, R38 and R39. The voltage drop across R39 biases transistor Q8 in the current conducting on state and completes the on state round robin continuous current flow for the on states of transistors Q8 and Q9. Both transistors Q8 and Q9 continue in the steady state on condition until either the power is turned off or one of the transistors is forced into an off state condition.

The timing "on" circuit (G) consists of active components IC5 and transistor Q7. The binary counter IC5 develops an internal pulse train whose frequency is determined by the values selected for resistors R27 and R28, and capacitor C12. The binary counter IC5 has several exiting terminals that will be at a low voltage level until a predetermined binary count has been reached at which time the voltage goes to a higher level. Each terminal is set for a different binary count, 2,4,8,16, etc. The combination of the time period of the frequency of the internal pulse train and the binary count selected will determine the time period before the exhaust system is to be turned on. The binary counter IC5 resets the count to zero when the voltage at node J, transistor Q8 is at a high voltage value. This voltage will be at a high voltage value during the off state of transistor Q8. Once transistor Q8 is turned on, the voltage at node J drops to a low value and the binary counter IC5 starts its counting process. Once the selected binary count has been reached, a positive voltage appears at node I which biases transistor Q7 to a current conducting on state. The current flowing into the collector terminal of transistor Q7 also flows through resistors R30 and R37. It is this current through resistor R37 that turns the second switching circuit (F), transistors Q8 and Q9, back to an off state condition i.e. deactivation signal 75. The added current through resistor R37 results in a higher voltage being dropped across resistor R37. The new voltage drop across resistor R37 plus the Vbe voltage drop across the base-emitter terminals of transistor Q9 add up to a higher voltage than the voltage dropped across the bias resistor R34 provided by the current flow through transistor Q8. Because the voltage across resistor R34 is less, current ceases to flow into transistor Q9 turning transistor Q9 to an off state condition which then turns transistor Q8 off.

As previously mentioned, the turn on bias voltage for transistor Q2 at node A is developed by the time to "on" circuit (G). Once the selected binary count of the binary counter IC5 has been reached, a positive voltage appears at node I which biases transistor Q7 to a current conducting on state. The voltage i.e. trigger signal 76, applied between the base terminal of transistor Q2 (i.e. node A) and the circuit ground turns the first switching circuit (C) on. This voltage is developed between the emitter terminal, node C, of transistor Q7 and circuit ground. The voltage is impressed across capacitor C14 and diode D4 in series with the circuit network from node A to circuit ground. Diode D4 serves as a blocking diode but in this case it allows current flow from the emitter of transistor Q7 to the base terminal of transistor Q2 but not in reverse. Capacitor C14 provides a low impedance for any surges or alternating voltage waveforms.

The time to "off" circuit (B) comprises active components which are very similar to the time to "on" circuit (G). A binary counter IC2 develops an internal pulse train whose frequency is determined by the values selected for resistors R2, R3, R4 and capacitor C2. The resistor R4 is a variable resistor which is adjustable via the timer control knob 54 on the removable panel portion 50. The binary counter IC2 has several exiting terminals that will be at a low voltage level until a predetermined binary count has been reached at which time the voltage goes to a higher level. Each terminal is set for a different binary count, 2,4,8,16, etc. The combination of the time period of the frequency of the internal pulse train and the binary count selected will determine the time period before the exhaust system is to be turned off. The binary counter IC2 resets the count to zero when the voltage at node G, transistor Q2 is at a high voltage value. This voltage will be at a high voltage value during the off state of transistor Q2. Once transistor Q2 is turned on, the voltage at node G drops to a low value i.e. timer on signal 79, and the binary counter starts its counting process. Once the selected binary count has been reached, a positive voltage appears at node H which biases transistor Q1 to a current conducting on state. The current flowing into the collector terminal of transistor Q1 also flows through resistors R5 and R11. It is this current through resistor R11 that turns the first switching circuit (C), transistors Q2 and Q3, back to an off state condition i.e. deactivation signal 81. The added current through resistor R11 results in a higher voltage being dropped across resistor R11. The new voltage drop across resistor R11 plus the Vbe voltage drop across the base-emitter terminals of transistor Q3 add up to a higher voltage than the voltage dropped across the bias resistor R8 provided by the current flow through transistor Q2. Because the voltage across resistor R8 is less, current ceases to flow into transistor Q3 turning transistor Q3 to an off state condition which then turns transistor Q2 off. When the first switching circuit (C) shuts off, the fan driver circuit (D) deactivates the fan 35.

While the form of the pet litter box with automatic exhaust system herein described constitutes the preferred embodiment of the invention, it is to be understood that the invention is not limited to the precise form disclosed herein, and that changes may be made herein without departing from the scope of the invention which is defined in the appended claims.

For instance, the time to "on" circuit (G) can include a variable resistor similar to the variable resistor R4, which resistor R4 provides for a selectable delayed fan turn-off time period, so that a variable delayed fan turn-on time period can be provided. Otherwise, the delayed fan turn-on time can be fixed at a predetermined length of time in accordance with the values of resistors R27 and R28, and capacitor C12 of the time to "on" circuit (G).

Further, other electronic components can be used to achieve the same control circuit operations described above. For instance, other devices such as a FET, SCR, or a relay can be used in place of the darlington transistor for conducting current through the fan coil. Other circuits such as a bistable multivibrator circuit, or a schmitt trigger circuit can be employed as switching circuits. The electronic devices can be packaged either as discrete component devices, as integrated circuits, or as an application specific integrated circuit (ASIC) variety. In addition, other remote or non-contacting passive electronic sensing techniques can be utilized to detect the presence of the animal upon entering the litter box. For instance, infrared light interruption, ultrasonic wave detection, heat sensing, weight sensing, acoustic sensing, and optical and microwave sensing techniques can all be employed to detect the animal.

What is claimed is:

1. A ventilated cat litter box, comprising:
 a base pan adapted to contain a quantity of cat litter therein, said base pan having a peripheral upper lip,
 a cover having spaced side walls joining with first and second end walls and forming at least a partial peripheral flange engaging and supported on said pan upper lip and forming a generally fluid-tight connection with said pan, said cover forming with said pan an interior space for receiving a cat therein, means in said first end wall defining an access opening therethrough by means of which a cat may enter into and exit from said interior space, means in said second side wall defining a ventilation opening, means associated with said second side wall forming an enclosed fan housing surrounding said ventilation opening, an electric fan in said fan housing positioned to withdraw air from said interior space through said ventilation opening, an air exhaust outlet in said fan housing providing for the escape of air withdrawn from said space by said fan, a fan source of electric fan power, and an electronic control circuit for connecting said source to said fan, said circuit including a pair of spaced capacitive pick-up members positioned along opposite sides of said access opening, said circuit responding to the presence of a cat between said members for connecting said power source to said fan, said circuit further including timer means for terminating operation of said fan after a predetermined time period has expired.

2. The ventilated cat litter box of claim 1, wherein said circuit further includes a second timer means for delaying the operation of said fan until after a second predetermined time period has expired since the cat was detected by said circuit.

3. The ventilated cat litter box of claim 2, wherein said first-mentioned and said second timer means each include means for varying said respective predetermined time periods.

4. The ventilated cat litter box of claim 1 further comprising said cover having a fluid impervious shield positioned in said space and adjacent to said ventilation opening, said shield preventing fluid and particle entry into said ventilation opening while permitting air flow therethrough.

5. The ventilated cat litter box of claim 1 further comprising an odor absorbing filter in said fan housing in the path of air movement by said fan therethrough for deodorizing air drawn by said fan through said ventilation opening.

6. In a power ventilated cat litter box including a pan for containing a quantity of cat litter, an enclosing housing over said pan with an opening therethrough for providing ingress and egress of a cat, the improvement in a fan power control circuit including a pair of spaced apart capacitive pick-up plates one each positioned at each side of said opening, an electronic control circuit connected to said plates and responding to the presence of a cat therebetween, said electronic control circuit controlling said fan motor by energizing said motor in response to said sensed presence of the cat.

7. The improvement of claim 6 further comprising timer means forming a part of said electronic control circuit for terminating the operation of said fan after a predetermined time has expired.

8. The improvement of claim 7 further comprising controllable means for varying the length of time of operation provided by said timer means.

9. The improvement of claim 7 further comprising second timer means forming a part of said electronic control circuit for initiating the operation of said fan after a predetermined time has expired.

10. The improvement of claim 9 further comprising first controllable means for varying the length of time of operation provided by said first-mentioned timer means, and second controllable means for varying the length of time before initiating the operation of said fan.

11. The improvement of claim 6 in which said presence detection initiates a cycle of operation, which cycle includes a delay in the initiation of power to the fan.

12. A ventilated litter box for an animal, the litter box comprising:

a housing having an access opening and a ventilation opening therethrough;

a fan secured to said housing for withdrawing air from within said housing through said ventilated opening; and a control circuit for controlling the operation of said fan, said control circuit including remote sensing means including a plurality of spaced apart capacitive pick-up members for detecting the presence of the animal within said housing.

13. The ventilated litter box claimed in claim 12, wherein said control circuit further includes timer means for terminating the operation of said fan after a predetermined time period has expired.

14. The ventilated litter box claimed in claim 13, wherein said control circuit further includes a second timer means for delaying the operation of said fan until after a second predetermined time period has expired since detecting the presence of the animal.

15. The ventilated cat litter box claimed in claim 14, wherein said first-mentioned and said second timer means each include means for varying said respective predetermined time periods.

* * * * *